United States Patent [19]

McCrory et al.

[11] Patent Number: 4,747,696
[45] Date of Patent: May 31, 1988

[54] MIXING AND BLENDING APPARATUS

[75] Inventors: Carl E. McCrory, West Covina; Herbert G. Hall, Calabassas, both of Calif.

[73] Assignee: Carl McCrory Enterprises Inc., West Covina, Calif.

[21] Appl. No.: 738,177

[22] Filed: May 28, 1985

Related U.S. Application Data

[63] Continuation-in-part of Ser. No. 608,641, May 9, 1984, abandoned.

[51] Int. Cl.$^4$ ................................................ B01F 7/16
[52] U.S. Cl. ...................................... 366/307; 99/348
[58] Field of Search ............... 366/307, 306, 302, 303, 366/228, 229, 225, 230, 231, 205, 314; 99/348

[56] References Cited

U.S. PATENT DOCUMENTS

| | | | |
|---|---|---|---|
| 975,380 | 11/1910 | Berntson | 366/307 |
| 1,020,814 | 3/1912 | Fay | 366/307 |
| 1,040,664 | 10/1912 | Griffith | 366/307 |
| 2,064,861 | 12/1936 | Stroud | 366/307 |

*Primary Examiner*—Robert W. Jenkins
*Attorney, Agent, or Firm*—Paul R. Wylie

[57] ABSTRACT

There is provided a mixing and blending apparatus having an axial impeller mounted for rotation in a container. A removable stationary baffle is spaced radially outwardly of the impeller blade with at least a portion extending upwardly from the plane of rotation of the impeller. The baffle has at least two axially spaced aperture means located intermediate the inner and outer edges of the baffle at a location in the upwardly extended portion of the baffle means to permit a portion of the mixable material to which rotational motion has been imparted to flow through the baffle. The baffle is held in position in the container by means of a screw and wing nut.

3 Claims, 2 Drawing Sheets

MIXING AND BLENDING APPARATUS

This application is a continuation-in-part of co-pending application Ser. No. 06/608,641 filed May 9, 1984, now abandoned.

GENERAL NATURE OF THE INVENTION

This invention relates generally to an improved mixer and blender which is particularly well suited to the mixing of powdered materials in liquids as well as the mixing of viscous food materials.

BACKGROUND OF THE INVENTION

There exists a variety of apparatus for the mixing and blending of liquids and viscous materials. These include mixers or blenders that have rotating impellers as does the instant invention. Examples of such mixers are shown in U.S. Pat. Nos. 1,304,349; 1,582,518; 2,159,856; 2,918,264; 3,273,865; and 3,404,870. While some of these mixers operate satisfactorily on certain materials, a problem remains particularly in the food industry in mixing powders with liquids as in the case of powdered milkshake materials, or in mixing of viscous food materials as exemplified by the pureeing of beans. The problem involves obtaining the proper rotational flow in combination with a suitable vortex for drawing materials such as dry powder into the liquid and the mixing of materials drawn by the vortex into the liquid phase in the mixer. According to this invention, the rotational flow is interrupted by baffles to convert the circumferential laminar flow to turbulent flow to promote mixing in the circumferential area of the mixer.

It has been found according to this invention that good results in mixing powdered materials into liquids such as milkshake materials into milk, or in mixing vegetable materials such as beans to obtain a puree, can be obtained in an impeller type mixer which operates together with a novel baffle arrangement.

According to the invention, there is provided an axial impeller mounted for rotation in a container. Further provided are removable stationary baffle means spaced radially outwardly of said impeller blade with at least a portion thereof extending upwardly from the plane of rotation of the impeller. The baffle has at least two axially spaced aperture means located intermediate the inner and outer edges of the baffle at a location in the upwardly extended portion of the baffle means to permit a portion of the mixable material to which rotational motion has been imparted to flow through the baffle. In a preferred form of the invention, the first aperture is at a position approximately level with the upper level of the mixable material in the container and the second one of the apertures is located at least about 40% of the axial distance from the plane of said impeller to the location of the first aperture. By spacing the apertures in this manner, it has been found that sufficient laminar flow is maintained through the baffles to maintain the vortex necessary to draw the solid materials to the area surrounding the impeller while at the same time sufficient turbulent flow is caused by the baffles to provide the mixing action. The laminar flow through the apertures also picks up the mixed material that has been agitated by being impeded against the baffles to carry it on around the edges of the container to the next baffle impediment.

As will be hereinafter described, the mixer of the current invention provides excellent results in mixing food materials not heretofor obtained by prior art mixers. In the case of powdered materials to be mixed into a liquid, the powdered phase must be intimately contacted with the liquid to achieve a fully mixed food product. This is also true in the case of pureeing foods such as beans wherein the skins or particles of varying density will form a separate phase that must be intimately mixed with the bean pulp to form a smooth pureed food.

It was an object of this invention to provide a mixer and blender for mixing powders in liquids and for mixing other food stuffs wherein the parts could be easily cleaned and removed from mixing containers.

A further object of this invention was to provide a mixer which could economically and efficiently mix various materials.

A further object of this invention was the provisions of a mixer baffle which could be inserted into an existing mixer container to obtain optimum mixing efficiency.

These and other objects of the invention were satisfied by the novel mixer and blender of this invention which is described herein.

DESCRIPTION OF THE DRAWINGS

The invention will be more fully understood and described in connection with the drawings in which.

DETAILED DESCRIPTION OF THE INVENTION

Figure 1:
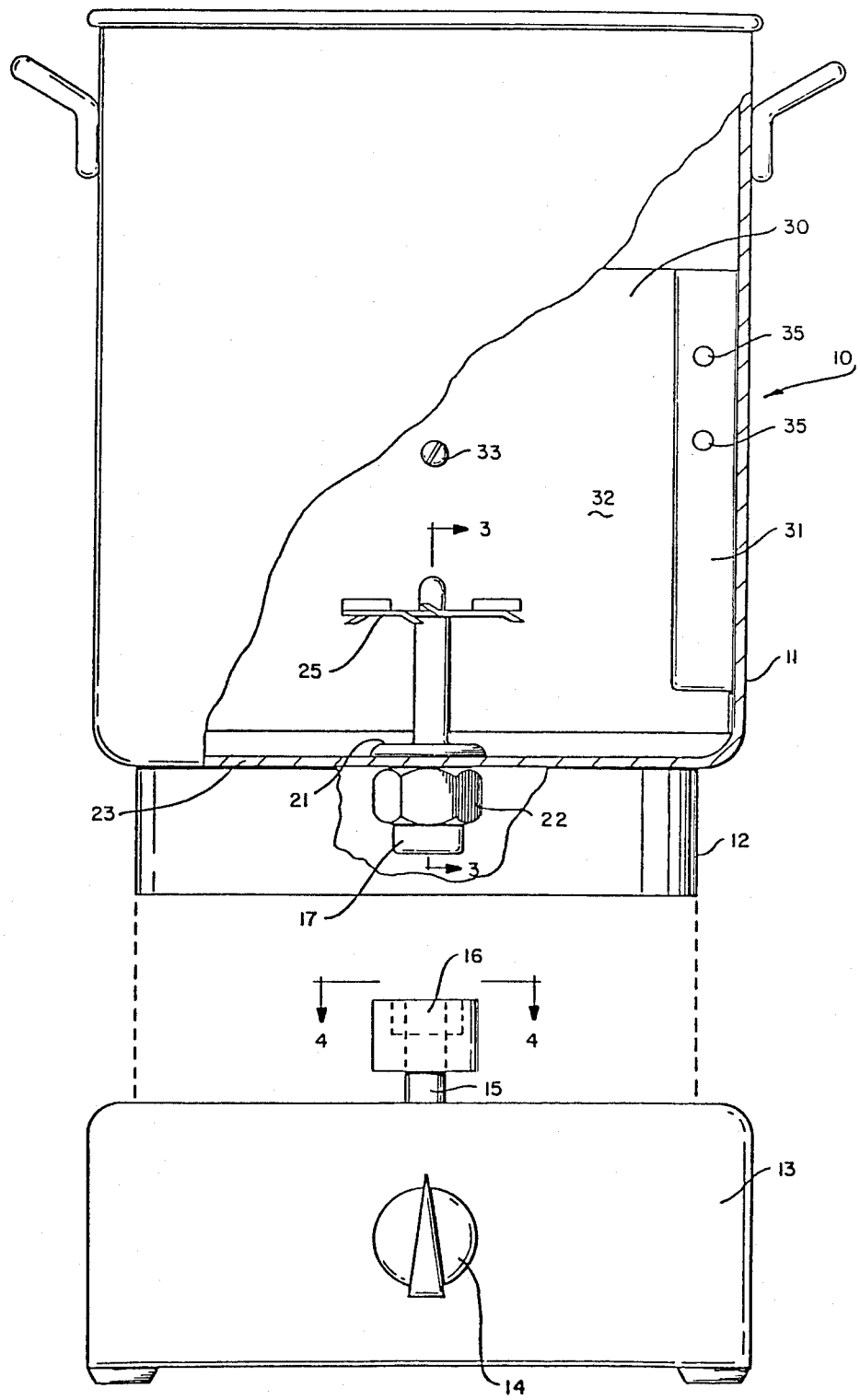
FIG. 1 is a front elevation view of a mixer assembly and electrical motor base showing the mixer of the invention partially broken away to show a portion of the interior of the mixer.

As shown in FIG. 1, the mixer 10 of this invention comprises a container 11 which is secured to a support member 12 and adapted to be mounted on a base 13. An electric motor, actuated by switch 14 is provided in base 13 to operate the mixer 10 with the motor being connected to drive drive shaft 15. Coupling blade 17, which extends downwardly from container 11, is adapted to be driven by drive coupling 16 attached to drive shaft 15 when mixer 10 is mounted on an electrical motor base 13.

Figure 3:
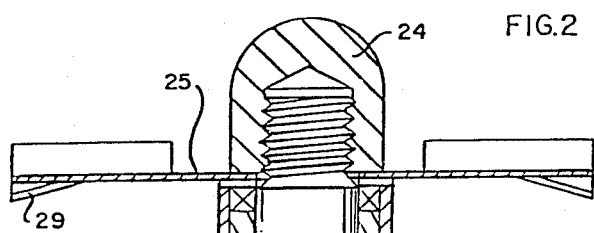
FIG. 3 is a view in enlarged cross-section taken on line 3—3 of FIG. 1.
Figure 4:
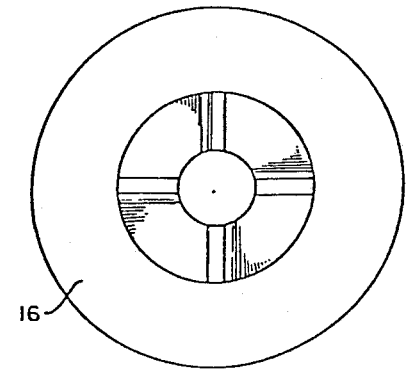
FIG. 4 is an enlarged top view of the mixer drive looking down on line 4—4 of FIG. 1; and, FIG. 5 is a view in perspective of a baffle arrangement according to the invention.

Referring now to FIG. 3, it will be seen that coupling blade 17 is attached to impeller drive shaft 18 which is mounted for rotation by bearings 19 within impeller drive shaft casing 20. Flange means 21 on said drive shaft casing 20 are provided to aid in securing casing 20 to the bottom 23 of container 11 with threaded nut 22. At the upper end of impeller drive shaft 18, threaded top nut 24 secures impeller 25 to said drive shaft.

Figure 2:
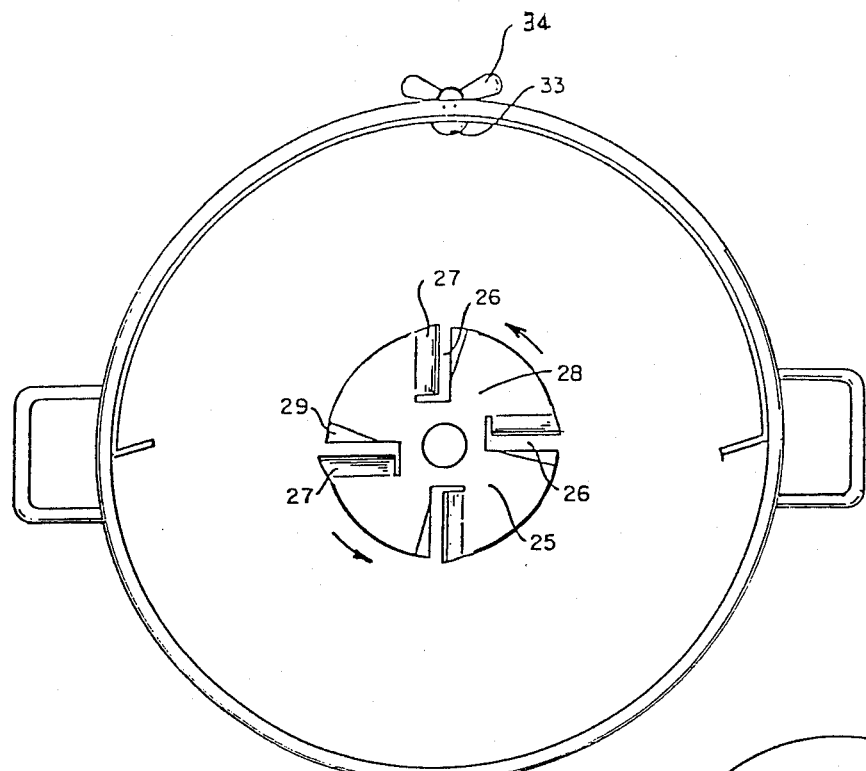
FIG. 2 is a top view of the mixer showing the baffles and blade structures.

Impeller 25 has a unique configuration, as shown in FIG. 2 and FIG. 3. The impeller is provided with four L-shaped cuts 26 disposed 90° apart. The portions of the blade within the L-shaped cut are elevated to form tabs 27, each of which extends upwardly at an angle of about 10° to the plane 28 of the impeller. The portions 29 of the blade adjacent each of the L-shaped cuts are depressed at an angle of about 5° to the plane of the blade.

Figure 5:
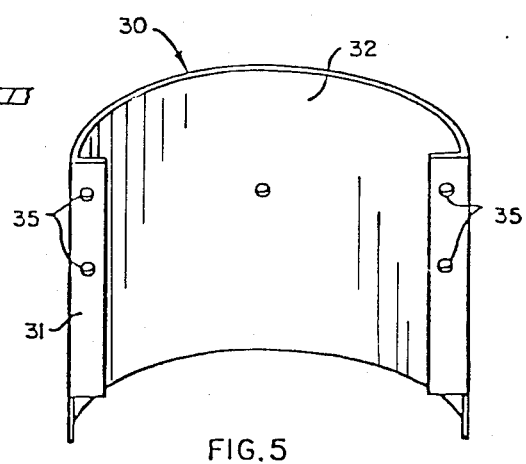

Disposed within the container 11 is baffle insert 30 as shown in FIG. 5. The baffle insert 30, in a preferred form, is formed of a single piece and includes two baffles 31 and an integral semi-cylindrical wall attachment portion 32 adapted to overlie the inner wall surface of container 11. According to the embodiment shown in FIG. 1 and FIG. 2, the baffle insert 30 is held in position in container 11 by means of threaded fastener 33 and wing nut 34. As shown, baffles 31 have an outer edge continuously contacting the inner wall surface of the container and an inner edge spaced radially inwardly from said outer edge. Baffles 31 are mounted at an angle into the flow of the liquid. By this arrangement, the baffles are securely fixed at the proper angle in the container, but the entire baffle insert may be removed from the container for cleaning by removing wing nut 34 and fastener 33.

The baffles 31, as shown, each have two apertures 35. The first, or upper aperture 35, is located at a position approximately level with the nominal upper level of the material to be mixed in the container. The second, or lower aperture 35, is located at least 40% of the axial distance from the plane of impeller 25 to the location of the upper aperture 35. Both apertures are located intermediate the inner and outer edges of baffles 31.

In use, the container is filled with a liquid medium and dry mix or food materials such as beans to be pureed. Typically, the dry mix floats on the surface of the liquid. If the material is for example a vegetable material such as cooked beans to be pureed, the skin material and some of the less dense pieces may likewise tend to remain on the surface. When the motor is turned on, impeller 25 rotates in a counterclockwise direction. The elevation of the tabs 27 causes a vortex to form in the rotating liquid sufficient to draw the floating material to the bottom of the container. The angle of the depressed portions 29 of the blade, together with the angle of the baffles 31 controls the flow of the liquid to prevent the liquid from being thrown out of the container. The apertures 35 in baffles 31 serve to permit sufficient laminer flow through the baffles to maintain the vortex necessary to draw the floating materials to the area surrounding the impeller 25 while at the same time sufficient turbulent flow is caused by the baffles to mix such materials into the liquids.

An added advantage of this arrangement as will be apparent from the drawings is that the angle of the baffles may be adjusted for each unit depending on the intended use. Angles of 0° to 20° can be used with angles for 4° to 15° being preferred. Generally, lesser angles have been found to be more suitable for the heavier and/or viscous materials handled in the mixer.

Other means of installing the baffles according to the invention are contemplated and from one to six baffles may be advantageously used. The preferred baffle arrangement is as shown in the drawings where baffle insert 30 may be formed from a single piece of stainless steel with smooth radiused corners intermediate baffles 31 and semi-circular section 32 to permit complete cleaning to satisfy sanitation requirements.

In a typical application of the mixer as shown, the impeller is operated at a speed in the range of about 1,000 RPM to 3,000 RPM with a speed in the range of about 1,500 RPM to about 2,000 RPM being preferred.

The mixer of the present invention is capable of mixing dry mixes into a large volume of liquid in a very short period of time (less than 30 seconds). It is also capable of comminuing foods (such as cooked beans) into a puree in a short period of time. The mixer of this invention not only differs in size from presently available mixers, but it contains a mixing blade having a unique configuration and a system of baffles, both of which are essential to the successful operation of the mixer. Thus, in order to mix a dry powder into a fairly large amount of liquid (e.g., 3-5 gallons) within a short period of time, the mixer must create a sufficient vortex to draw the powder to the bottom of the mixer. However, if that is done without some modification, the force required to draw the powder and liquid to the bottom of the mixer causes the liquid to impact the bottom and sides of the mixer with such force that liquid is thrown out of the mixer. If the force is reduced to prevent such discharge of liquid from the mixer, it is insufficient to adequately mix the powder into the liquid.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A mixer for liquids comprising:
   (a) a container having inner and outer wall surfaces;
   (b) an axial impeller mounted in said container rotatable impeller blade means adapted to rotate in a fixer plane for imparting rotational motion with respect to the axis of said impeller to a mixable material in contact therewith;
   (c) a removable stationary baffle means to impede the rotational motion of said mixable material comprising a single piece and including at least one inwardly extending baffle having an outer edge continuously contacting the inner wall surface of said container and an inner edge and an integral wall attachment portion adapted to overlie the inner wall surface of said container said integral wall attachment portion of said removable stationary baffle means being formed as a semi-circular section and said baffle means being held in position in said container by means of a threaded fastener and wing nut, said fastener passing through said wall attachment portion and said container; and,
   (d) at least two axially spaced aperture means located intermediate the inner and outer edges of said baffle means at a location in said upwardly extended portion of said baffle means to permit a portion of said mixable material to which rotational motion has been imparted by said impeller blade means to flow through said baffle means, a first one of said aperture means being located at a position approximately level with the upper level of said mixable material when said mixer is in use, and a second one of said apertures being located at least about 40% of the axial distance from the plane of said impeller to said first aperture.

2. A mixer according to claim 1 wherein there are two baffles spaced 180° apart.

3. A mixer according to claim 1 wherein said baffles are slanted at an angle of about 4° to about 15° into the flow of the material to be mixed.

* * * * *